United States Patent
Bogdanovic et al.

(10) Patent No.: US 11,919,469 B2
(45) Date of Patent: Mar. 5, 2024

(54) LATERAL AIRBAG, VEHICLE OCCUPANT RESTRAINT SYSTEM HAVING A SEAT-INTEGRATED AIRBAG MODULE AND VEHICLE SEAT HAVING A SEAT-INTEGRATED AIRBAG MODULE

(71) Applicant: ZF AUTOMOTIVE GERMANY GMBH, Alfdorf (DE)

(72) Inventors: Stojan Bogdanovic, Schwäbisch Gmünd (DE); Dominique Acker, Gschwend (DE); Achim Kartenberg, Durlangen (DE); Joana Hessel, Schwäbisch Gmünd (DE); Sotirios Fotopoulos, Valladolid (ES)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/616,206

(22) PCT Filed: Jun. 3, 2020

(86) PCT No.: PCT/EP2020/065296
§ 371 (c)(1),
(2) Date: Dec. 3, 2021

(87) PCT Pub. No.: WO2020/245161
PCT Pub. Date: Dec. 10, 2020

(65) Prior Publication Data
US 2022/0242356 A1    Aug. 4, 2022

(30) Foreign Application Priority Data
Jun. 5, 2019  (DE) .................. 102019115150.3

(51) Int. Cl.
| | | |
|---|---|---|
| *B60R 21/207* | (2006.01) | |
| *B60R 21/00* | (2006.01) | |
| *B60R 21/231* | (2011.01) | |

(52) U.S. Cl.
CPC ...... *B60R 21/207* (2013.01); *B60R 21/23138* (2013.01); *B60R 2021/0048* (2013.01);
(Continued)

(58) Field of Classification Search
CPC ............ B60R 21/207; B60R 21/23138; B60R 2021/0048; B60R 2021/2074; B60R 2021/23146
See application file for complete search history.

(56) References Cited

U.S. PATENT DOCUMENTS

| | | | |
|---|---|---|---|
| 2008/0007035 A1* | 1/2008 | Acker ................... | B60R 21/261 |
| | | | 280/742 |
| 2009/0200774 A1* | 8/2009 | Nam .................. | B60R 21/23138 |
| | | | 280/730.2 |

(Continued)

FOREIGN PATENT DOCUMENTS

| | | | | |
|---|---|---|---|---|
| DE | 19646698 A1 | 5/1997 | | |
| DE | 19626761 C1 * | 10/1997 | ........... | B60N 2/4876 |

(Continued)

OTHER PUBLICATIONS

PCT International Search Report for corresponding International Application Serial No. PCT/EP2020/065296, dated Aug. 4, 2020, pp. 1-5.

*Primary Examiner* — Karen Beck
(74) *Attorney, Agent, or Firm* — TAROLLI, SUNDHEIM, COVELL & TUMMINO L.L.P.

(57) ABSTRACT

The invention describes a side airbag (2) of a vehicle occupant restraint system (10) provided to be mounted on a vehicle seat (4) and having at least one fabric cut (6, 7) and one gas cushion (8), wherein the side airbag (2) includes at (Continued)

least three fastening points (12, 14, 16) for mounting on the vehicle seat (4), in particular on a vehicle seat frame, wherein at least a first fastening point (12) and a second fastening point (14) are arranged in the at least one fabric cut (6, 7), wherein the first and second fastening points (12, 14) are arranged, in a condition mounted on the vehicle seat (4), in an upper area of the side airbag (2) and in a vehicle seat transverse direction (Q) are arranged at a distance (a) from each other. The invention also describes a vehicle occupant restraint system (10) comprising a seat-integrated airbag module (30) and a vehicle seat (4) comprising a seat-integrated airbag module (30) each of which comprises a side airbag (2) of this type.

9 Claims, 4 Drawing Sheets

(52) U.S. Cl.
CPC ............. *B60R 2021/2074* (2013.01); *B60R 2021/23146* (2013.01)

(56) References Cited

U.S. PATENT DOCUMENTS

| | | | | |
|---|---|---|---|---|
| 2012/0280478 A1* | 11/2012 | Fink | ............... | D05B 35/02 |
| | | | | 112/475.08 |
| 2019/0389421 A1* | 12/2019 | Sturm | ............... | B60R 21/233 |

FOREIGN PATENT DOCUMENTS

| | | | | |
|---|---|---|---|---|
| DE | 10204486 A1 | 8/2003 | | |
| DE | 102009006688 A1 * | 8/2010 | ........... | B60R 21/207 |
| DE | 102009006688 A1 | 8/2010 | | |
| DE | 102012008390 A1 * | 10/2013 | ............. | B60R 21/20 |
| DE | 102012008391 A1 | 10/2013 | | |
| DE | 102015016347 A1 * | 6/2017 | ........... | B60R 21/207 |
| DE | 102017125755 A1 | 5/2019 | | |
| DE | 102018103071 A1 | 5/2019 | | |
| EP | 1132261 A1 | 9/2001 | | |
| EP | 2050630 A1 | 4/2009 | | |
| EP | 2799291 A1 | 11/2014 | | |
| EP | 2960116 A1 | 12/2015 | | |
| GB | 2414442 A * | 11/2005 | ............. | B60R 22/02 |
| WO | WO-2020255817 A1 * | 12/2020 | ........... | B60R 21/207 |

* cited by examiner

LATERAL AIRBAG, VEHICLE OCCUPANT RESTRAINT SYSTEM HAVING A SEAT-INTEGRATED AIRBAG MODULE AND VEHICLE SEAT HAVING A SEAT-INTEGRATED AIRBAG MODULE

RELATED APPLICATIONS

This application is a U.S. National Stage Application filed under 35 USC 371, claiming priority to Serial No. PCT/EP2020/065296, filed on 3 Jun. 2020; which claims priority from German Patent Application DE 10 2019 115 150.3, filed 5 Jun. 2019, the entireties of which are hereby incorporated herein by reference.

TECHNICAL FIELD

The invention relates to a side airbag, a vehicle occupant restraint system comprising a seat-integrated airbag module and a vehicle seat comprising a seat-integrated airbag module.

BACKGROUND

For better protection of the upper torso and, particularly, the head of a vehicle occupant by an airbag, said body parts are endeavored to be restrained as early as possible by an airbag.

It is also known from prior art to dispose an airbag between two vehicle seats to prevent the vehicle occupants from colliding in the event of a side impact. Such airbag is also referred to as middle airbag. The airbag also protects the vehicle occupant associated therewith from over-oscillating beyond his/her seat so that the vehicle occupant does not strike hard structures of the vehicle interior of the neighboring side.

Known middle airbags but also other side airbags are maintained in position via anchor straps and/or positioning means attached to the outside so as to prevent the vehicle occupant from over-oscillating, for example. However, in manufacture it is complicated and expensive to arrange those anchor straps or positioning means.

SUMMARY

It is the object of the invention to provide a side airbag, in particular a middle airbag, for vehicle occupants by which quick, safe and stable positioning in its final inflated shape can be obtained.

ACHIEVING THE OBJECT

The features according to the claims result in achieving the object. Advantageous configurations are described in the subclaims.

The object of the invention is achieved by a side airbag comprising the features of claim 1. The side airbag of a vehicle occupant restraint system is provided to be mounted on a vehicle seat. The side airbag according to the invention includes at least one fabric cut and one gas cushion, the at least 0 one gas cushion being formed of the at least one fabric cut. The side airbag has at least three fastening points for mounting on the vehicle seat, in particular on a vehicle seat frame of the vehicle seat: At least first and second fastening points are arranged in the at least one fabric cut. In a preferred embodiment, all fastening points are arranged in the at least one fabric cut. The first and second fastening points are introduced to the fabric cut such that they are arranged, in a condition mounted on the vehicle seat, in an upper area of the side airbag and, accordingly, are arranged at a distance from each other in a vehicle seat transverse direction.

The first fastening point is distant further from a vehicle seat side on which the side airbag is mounted on the vehicle seat than the second fastening point. Thus, the first fastening point is arranged more closely to the center of the vehicle seat than the second fastening point. This enables in particular the side airbag to be easily positioned close to the vehicle occupant. In addition, the arrangement of the first and second fastening points spaced apart in the vehicle seat transverse direction can help bring also a side airbag having a simple cushion shape which includes merely two connected fabric cuts, for example, to a position curved with respect to the vehicle occupant in the filled condition.

The first and/or second fastening point(s) is/are arranged in the fabric cut particularly in a non-inflatable area of the side airbag, the first and/or second fastening point being preferably arranged spaced apart from a rear edge of the gas cushion. The first and/or second fastening point(s) is/are arranged, in particular in a vehicle seat longitudinal direction, in the non-inflated condition mounted on the vehicle seat at a longitudinal distance behind a rear edge of the gas cushion. In a typical embodiment, at least the first fastening point, preferably the first and second fastening points, is/are arranged in the vehicle seat longitudinal direction at a longitudinal distance behind the rear edge of the gas cushion. In particular in the gas-filled condition of the side airbag, the longitudinal distance at which the first and/or second fastening point(s) is/are arranged spaced apart from the rear edge of the gas cushion can be arranged obliquely relative to the vehicle seat longitudinal direction.

The arrangement of at least the first and second fastening points in the fabric cut can help optimize the positioning of the side airbag during filling in a restraint situation in a simple manner and, moreover, can help stabilize the same particularly when the vehicle occupant is restrained, without any separate anchor straps and/or positioning means having to be attached to the side airbag in a complicated manner to this end. Thus, the manufacture can be facilitated by a structure according to the invention as compared to side airbags having separate anchor straps and/or positioning means, as the fastening points are already comprised in the fabric cut and, for example, possibly required reinforcing seams can be introduced in an automated sewing operation in which the gas cushion is formed of the at least one fabric cut. In typical embodiments, the fastening points are formed by recesses/cutouts in the fabric cut which serve for receiving a fastener, such as, e.g., a bolt or a fastening clip.

It has turned out that the positioning and the stabilization of the position of the side airbag during filling and during restraint of the vehicle occupant are particularly effective, provided that, in the mounted state of the side airbag, the distance in the vehicle seat transverse direction between the first fastening point and the second fastening point is no less than 100 mm. In addition, it has turned out that the positioning and the stabilization of the position of the side airbag during filling and during restraint of the vehicle occupant are also particularly effective, provided that the longitudinal distance at which the first and/or second fastening point(s) is/are arranged in the vehicle seat longitudinal direction behind the rear edge of the gas cushion is no greater than 100 mm.

Each of the vehicle seat longitudinal direction, the vehicle seat transverse direction and the vehicle seat vertical direction relates to the vehicle seat, the vehicle seat longitudinal direction describing the direction that corresponds to the viewing direction of a vehicle occupant seated in the vehicle seat. The vehicle seat transverse direction corresponds to a direction that is aligned perpendicularly to the vehicle seat longitudinal direction and extends from one vehicle seat side to the opposite vehicle seat side. The vehicle seat vertical direction corresponds to a direction that is aligned perpendicularly to the vehicle seat longitudinal direction and to the vehicle seat transverse direction and that extends substantially from a seat bottom upwards toward a headrest of the vehicle seat. The indications relate to a vehicle seat in a standard position with a substantially vertically adjusted backrest. The rear edge of the gas cushion describes the rear end in the vehicle seat longitudinal direction of the inflatable volume of the gas cushion. The first and/or second fastening point(s) thus is/are arranged in a non-inflatable area of the fabric cut that is connected to the rear of the inflatable volume of the gas cushion in the vehicle seat transverse direction.

The side airbag in a typical embodiment is a middle airbag. Such middle airbag is preferably arranged between two vehicle seats to prevent the vehicle occupants from colliding in the event of a side impact. In addition, such middle airbag can also protect the vehicle occupants, in the event of a so-called far-side collision, from over-oscillating beyond their seats. A far-side collision corresponds to a collision in which an impact occurs on a vehicle side opposite to the vehicle occupant, i.e., when the collision occurs on the passenger side, for example, and the vehicle occupants seated in the driver seat is intended to be laterally supported. Accordingly, the middle airbag can help restrict the movement and the involved acceleration acting on the vehicle occupant. Further, in this way the vehicle occupant can be prevented from hitting hard structures of the vehicle interior or of the neighboring side, for example. A middle airbag of this type is usually mounted on a side of the vehicle seat frame of the vehicle seat facing an adjacent seat, for example on the side of the driver seat of a vehicle facing the passenger seat.

In a preferred embodiment, the side airbag includes an inflatable head gas cushion and an inflatable torso gas cushion connected to the head gas cushion both of which form separate inflatable chambers of the side airbag. The head gas cushion and the torso gas cushion are formed by separate inflatable gas cushions which are secured to each other in a connecting area.

In one embodiment, in such side airbag the second and third fastening points are arranged in the fabric cut of the torso gas cushion, and the first fastening point is arranged in the fabric cut of the head gas cushion.

In an alternative embodiment, in such side airbag the first and second fastening points are arranged in the fabric cut of the head gas cushion, and the third fastening point is arranged in the fabric cut of the torso gas cushion.

Such a design including a head gas cushion and a torso gas cushion allows for realizing even complex three-dimensional shapes in the inflated state at low cost, because the head gas cushion and the torso gas cushion are manufactured independently of each other as separate gas cushions. The shape of the entire side airbag can be easily adapted to the respective application through fastening the two gas cushions to each other in the connecting area. The positioning of the head gas cushion and the torso gas cushion in the filled condition can be influenced particularly by the position and the arrangement of the first fastening point or of the first and second fastening points. For optimum positioning and/or stabilization of the filled side airbag, in the mounted condition of the side airbag the distance in the vehicle seat transverse direction between the first fastening point and the second fastening point should be no less than 100 mm. In addition, the longitudinal distance at which the first and/or the second fastening point(s) is/are arranged in the vehicle seat longitudinal direction behind the rear edge of the gas cushion should be no greater than 100 mm.

Preferably, the head gas cushion is secured to an upper end of the torso gas cushion. In this way, a side airbag is formed in which, when viewed in the vehicle seat vertical direction, the head gas cushion is adjacent to the torso gas cushion. With this design, the position of the inflated head gas cushion in space can be easily adapted to the respective requirements by attaching the head gas cushion in the appropriate orientation to the torso gas cushion. In particular, the position of the head gas cushion can be adapted by arranging/positioning the first fastening point or the first and second fastening points in the fabric cut of the head gas cushion.

A curved shape of the inflated side airbag can be easily obtained by such a design of the side airbag, although both the head gas cushion and the torso gas cushion may exhibit a simple cushion shape with only two connected fabric cuts, for example.

The side airbag particularly includes a constriction between the head gas cushion and the torso gas cushion which is formed by the connecting area. Both the head gas cushion and the torso gas cushion may be in the form of elongate flat cushions the inflated thickness of which is, for example, significantly smaller than the length thereof from their lower end to their upper end, in the mounted and inflated condition of the side airbag.

The outer wall of the respective gas cushion in this case has each of an outer wall portion close to the vehicle occupant and an outer wall portion remote from the vehicle occupant in the inflated condition of the side airbag (relating to the associated vehicle seat) whose distance defines the thickness of the inflated side airbag. In this way, an elongate, possibly curved, but on the whole flat side airbag is resulting, if both gas cushions are connected to each other in the edge areas of the outer wall portions. However, it would also be imaginable to dispose the head gas cushion so-to-speak laterally and to connect it on a surface of the outer wall portion close to the vehicle occupant to the upper end of the torso gas cushion so as to impart a complex three-dimensional shape to the side airbag.

Preferably, the head gas cushion is connected to the torso gas cushion so that, in the inflated condition of the side airbag, the head gas cushion is bent vis-à-vis the torso gas cushion. This shape can be obtained by basically attaching two separate gas cushions to each other at an angle and connecting them to each other. Advantageously, the angle is selected so that the head gas cushion in the inflated state is inclined toward the associated vehicle seat so that the head of the vehicle occupant seated in the vehicle seat can be absorbed gently at an early stage.

In general, it can be achieved that an occupant side of the side airbag formed by the outer wall portions of the head gas cushion and the torso gas cushion close to the vehicle occupant is more concavely curved than in the case of a side airbag which consists of only one gas cushion. This shape of the side airbag and the arrangement of the fastening points, in particular of the first and/or second fastening point(s), effectuates a positioning of the head gas cushion toward the vehicle occupant already during inflation so that an early and gentle contact can be made with the occupant.

The outer wall of the head gas cushion may include two outer wall portions which are connected to each other along a circumferential line. Said circumferential line defines a parting plane of the head gas cushion. Correspondingly, the outer wall of the torso gas cushion may include two outer wall portions which are connected to each other along a circumferential line, the circumferential line defining a parting plane of the torso gas cushion. The parting plane of the head gas cushion is preferably inclined at an angle of from about 20° to 90° with the parting plane of the torso gas cushion.

The circumferential line is formed by the connection of the outer wall portions to form the cushion shape. In the simplest case, there are provided two separate fabric cuts which are interconnected along their edges in the circumferential line so that they form a gas cushion. In one variant, only one single fabric cut is provided for each gas cushion which is folded back on itself once so that two superimposed outer wall portions are formed which are interconnected at the free edges, thus forming the gas cushion. The edges may be connected in any suitable manner, in particular by sewing, gluing or welding. Of course, it is also possible to produce the two outer wall portions in a joint weaving process in which the entire gas cushion is woven in one piece as portions of two-layer fabric cut and warp and weft yarns of the outer wall portions merge into a joint circumferential line at the edges of the outer wall portions.

All afore-described embodiments have in common that at least the first fastening point or, in an alternative embodiment, at least the first and second fastening points are located in a non-inflatable area of the head and torso gas cushions formed by the fabric cut or fabric cuts.

In order to bend the head gas cushion vis-à-vis the torso gas cushion, the connecting area between the head gas cushion and the torso gas cushion is advantageously located on the side of the parting planes of the two gas cushions close to the vehicle occupant. In this way, a curvature of the inflated side airbag toward the vehicle occupant is resulting, when viewed along the vehicle seat vertical direction. Accordingly, an extension of the head gas cushion and the torso gas cushion along the respective parting plane, when viewed in the vehicle seat longitudinal direction, is preferably larger than a thickness of the inflated head or torso gas cushion, viz. larger than the distance of the respective outer wall portions.

It is possible to fabricate the side airbag so that all fabric cuts of the outer wall portions can separately be flatly spread. On principle, the entire side airbag could be made of only two fabric cuts one of which forms the head gas cushion and the other forms the torso gas cushion. Of course, it is also possible to impart a three-dimensional shape to the outer wall portions, for example by introducing gathered seams or darts to originally flat fabric cuts or by weaving the two gas cushions three-dimensionally from the start.

It is equally imaginable to provide, in one or both of the gas cushions, inside the inflatable area additional non-inflatable portions in which, for example, opposite outer wall portions are connected to each other while being directly superimposed so as to increase the stability of the side airbag and to obtain an individual shaping.

The inflatable volume of the head gas cushion may be smaller than that of the torso gas cushion. The connecting area advantageously has at least one overflow opening which fluidically connects the head gas cushion to the torso gas cushion so that both gas cushions can be filled via one single gas generator.

Furthermore, the side airbag may comprise a positioning element. In a typical embodiment, the positioning element is secured both to the torso gas cushion and to the head gas cushion of the side airbag. The positioning element may be configured as a fabric element, for example, which is secured, based on the inflated condition of the side airbag, to a front edge at the circumferential line of each of the torso gas cushion and the head gas cushion. The positioning element may have a single-part or multi-part design. For example, the positioning element may consist of two fabric elements which are connected by a connecting line. By arranging the connecting line of the fabric elements, the positioning of the head gas cushion relative to the torso gas cushion can be additionally influenced. The positioning element can help additionally optimize and/or stabilize the positioning and/or the position of the head gas cushion relative to the torso gas cushion.

The object according to the invention is also achieved by a vehicle occupant restraint system comprising the features of claim 9. A vehicle occupant restraint system according to the invention comprises a seat-integrated airbag module which includes a side airbag as described in the foregoing. The airbag module and, thus, the side airbag are mounted on a side of the vehicle seat facing an adjacent seat, in particular on a side of the vehicle seat frame of the vehicle seat facing an adjacent seat. For example, the airbag module of the vehicle occupant restraint system comprising a side airbag configured as middle airbag is mounted on a driver seat of a vehicle on the side facing a passenger seat of the vehicle. The side airbag therefore does not only offer protection to the driver, but can also prevent the driver and the passenger from contacting each other.

Furthermore, the object according to the invention is also achieved by a vehicle seat comprising a seat-integrated airbag module comprising the features of the claims which include a side airbag as described above.

The vehicle seat, in particular the vehicle seat frame comprises at least one fastening location for fastening the side airbag.

In one embodiment, a first fastening location for fastening the first fastening point of the side airbag is arranged in the area of an upper edge of the backrest of the vehicle seat and a third fastening location for fastening the third fastening point of the side airbag is arranged on a lateral edge of the backrest.

The second fastening location for fastening the second fastening point of the side airbag may be arranged on a lateral edge of the backrest in the vehicle seat vertical direction above the third fastening location. As an alternative, the second fastening location may be arranged in the area of an upper edge of the backrest, where, in such embodiment, the second fastening location in the vehicle transverse direction is arranged more closely to the lateral edge of the backrest than the first fastening location and, moreover, is arranged above the third fastening location.

BRIEF DESCRIPTION OF FIGURES

Further advantages, features and details of the invention will be evident from the following description of embodiments which are not meant to be limiting as well as by way of the drawings, wherein.

DESCRIPTION

Figure 1:
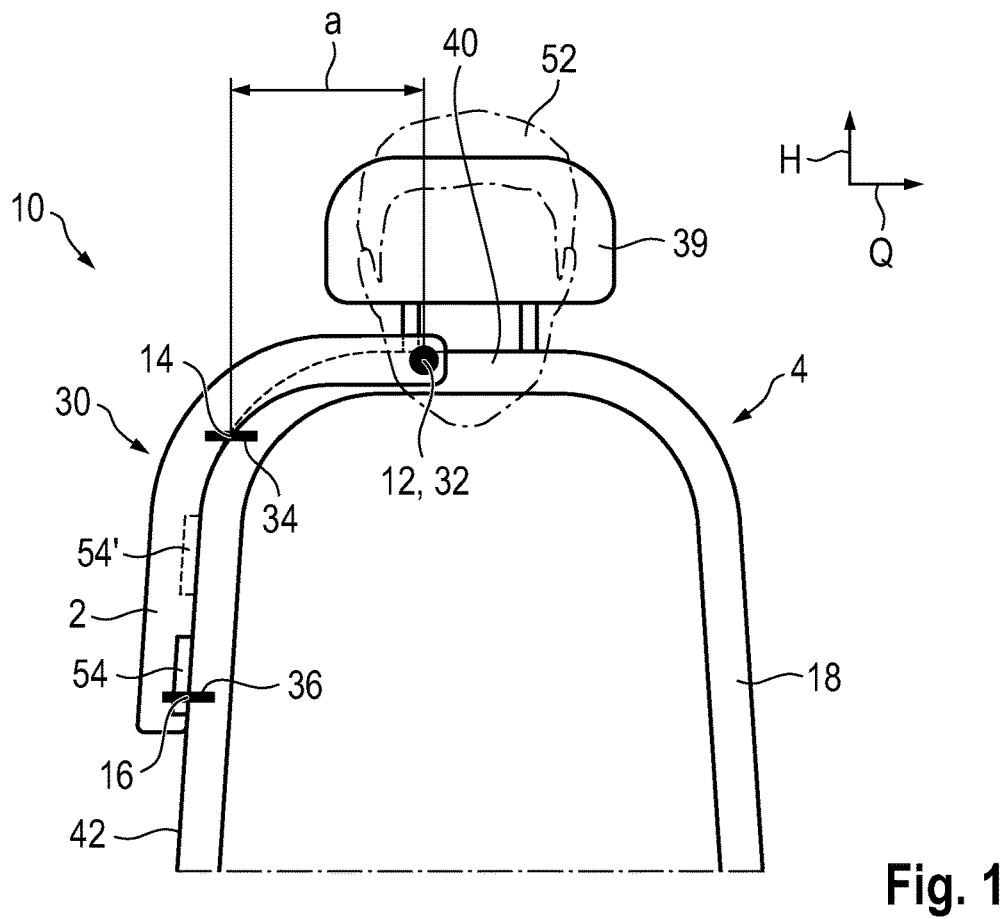
FIG. 1 shows a schematic front view of a portion of a vehicle seat with a side airbag according to the invention in a folded condition mounted on the vehicle seat.
Figure 2:
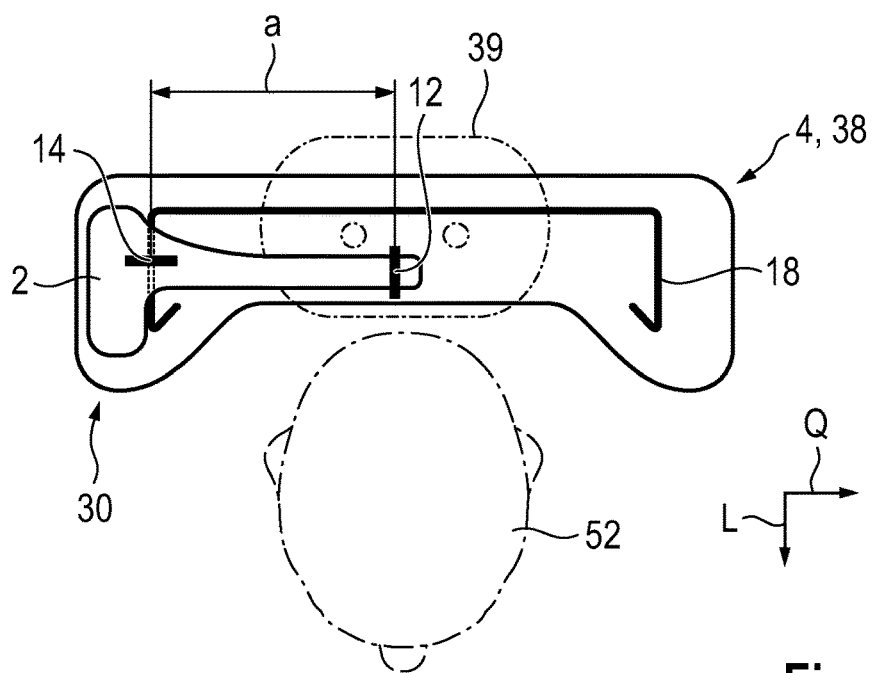
FIG. 2 shows a schematic top view onto the vehicle seat and the side airbag according to FIG. 1.

FIGS. 1 and 2 schematically show, in different views, a vehicle seat 4 of a vehicle occupant restraint system 10 comprising a side airbag 2 according to the invention. The side airbag 2 is shown, in FIGS. 1 and 2, in a folded condition mounted on the vehicle seat frame 18 of the vehicle seat 4. In FIG. 1, merely the vehicle seat frame 18 is shown for a better overview. FIG. 2 shows the arrangement of the airbag module 30 with the side airbag 2 inside the backrest 38 of the vehicle seat 4. In addition, a headrest 39 and, schematically, a head 52 of a vehicle occupant are illustrated.

Figure 3:
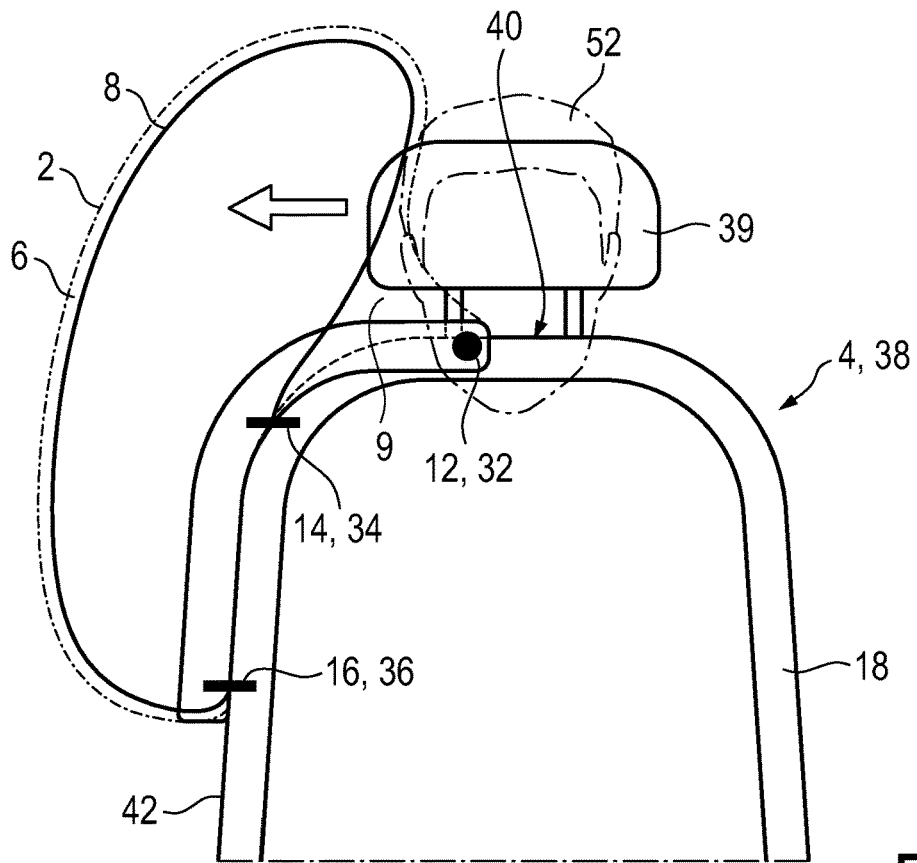
FIG. 3 shows a schematic front view of the portion of the vehicle seat according to FIG. 1 with a side airbag according to the invention in a deployed condition.
Figure 4:
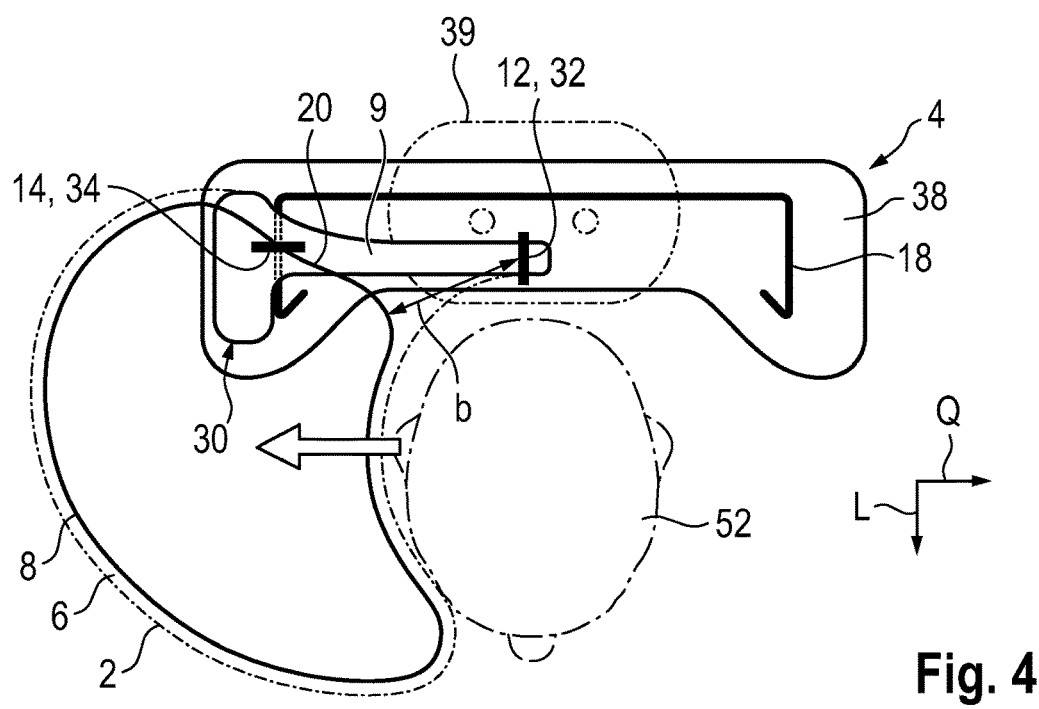
FIG. 4 shows a schematic top view onto the vehicle seat and the side airbag according to FIG. 3.

FIGS. 3 and 4 illustrate the vehicle seat 4 with a deployed side airbag 2, where, in this case, an outer envelope of the side airbag 2 is schematically shown by the dash-dot line, and the continuous line located inside the outer envelope schematically shows the gas cushion 8 adapted to be filled with gas which constitutes the inflatable area of the side airbag 2. As is visible from FIG. 4, at least the first fastening point 12 is arranged in a non-inflatable area 9 of the fabric cut 6 of the side airbag 2.

The side airbag 2 is mounted to the vehicle seat 4, in this case the vehicle seat frame 18 of the vehicle seat 4, via the fastening point 12, 14 and 16. As is evident especially from FIGS. 1 and 3, the first fastening point 12 and the second fastening point 14 are arranged in the condition mounted on the vehicle seat in an upper area of the side airbag 2. The third fastening point 16, on the other hand, is arranged in a lower area of the side airbag 2.

The first fastening point 12 is fastened to a first fastening location 32 and the second fastening point 14 is fastened to a second fastening location 34 on the vehicle seat frame 18. The first and second fastening points 12, 14 are arranged, in the mounted condition, in the vehicle seat transverse direction Q at a distance a from each other. Also, the first and second fastening locations 32, 34 are arranged on the vehicle seat frame 18 at the distance a from each other. In order to obtain optimized positioning and stabilization of the positioning of the side airbag 2, the distance a should be no less than 100 mm. Fastening is effectuated via suitable fasteners, such as via bolts or fastening clips.

In particular the third fastening location 36 and/or the second fastening location 34 can also be used for fastening a gas generator 54 of the airbag module 30, apart from attaching and fastening the side airbag 2 (see FIG. 1). Alternatively, the gas generator 54' (exemplary alternative position shown in broken lines in FIG. 1) can also be arranged at separate gas generator fastening points at which moreover the side airbag 2 can be additionally fastened on the vehicle seat 4. In particular, a fastening point of the side airbag 2, which is also used for fastening the gas generator 54, 54', can be arranged inside the inflatable area of the gas cushion 8 of the side airbag 2.

It is further visible from FIG. 4 that the first fastening point is arranged at a longitudinal distance b from the rear edge 20 of the gas cushion 8 in a non-inflatable area 9 of the fabric cut 6. In the inflated condition according to FIG. 4, the longitudinal distance b is tilted vis-à-vis the vehicle seat longitudinal direction L. The longitudinal distance b should not be greater than 100 mm to achieve safe and stable positioning of the side airbag 2.

In the embodiment according to FIGS. 1 to 4, the first fastening location 32 for fastening the first fastening point 12 of the side airbag 32 is arranged in the area of an upper edge 40 of the backrest 38 on the vehicle seat frame 18. The second fastening location 34 for fastening the second fastening point 14 as well as the third fastening location 36 for fastening the third fastening point 16 are arranged in the area of the lateral edge 42 of the backrest 38 on the vehicle seat frame, the second fastening location 34 being arranged in the vehicle seat vertical direction H above the third fastening location 36.

Figure 5:
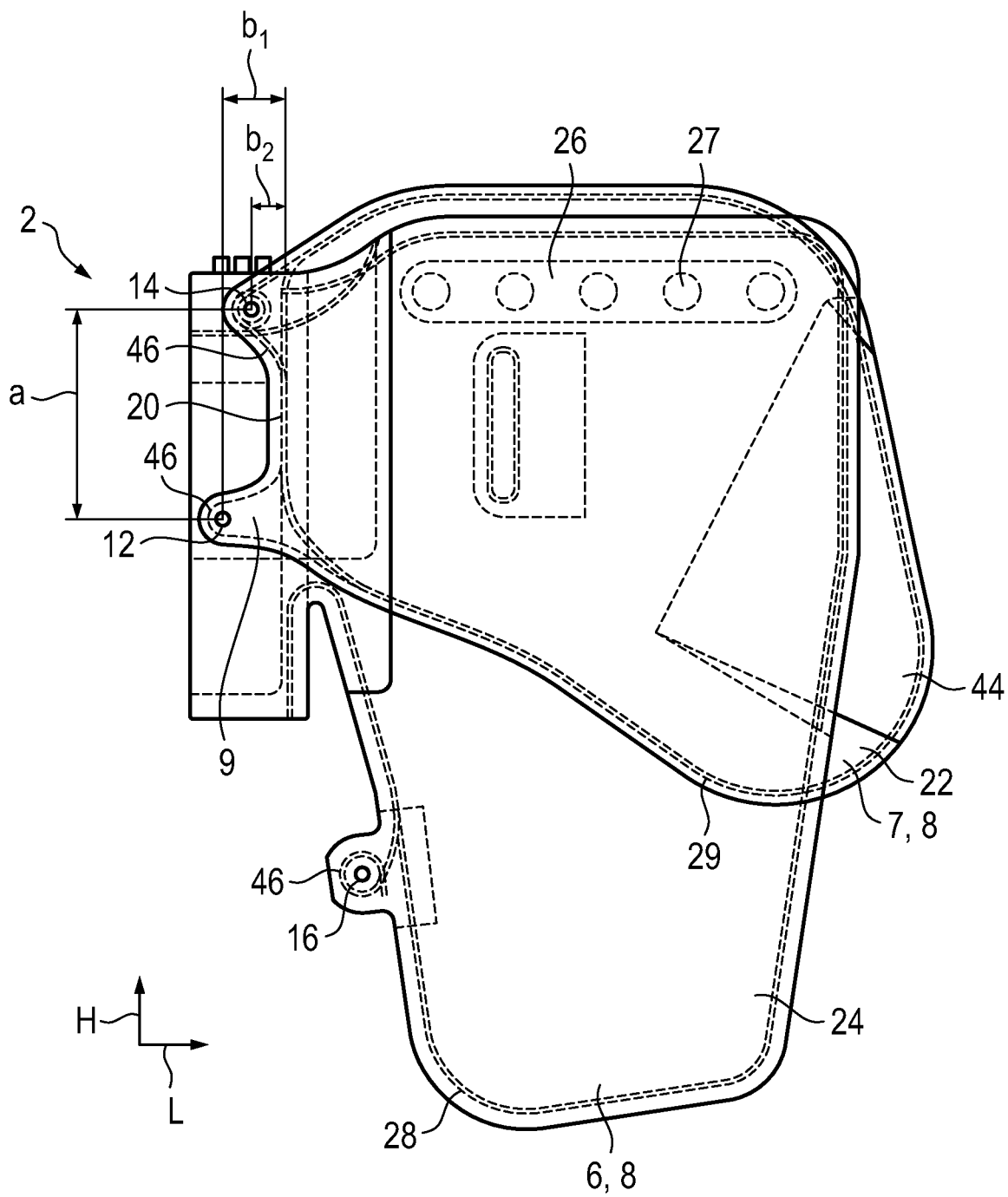
FIG. 5 shows a schematic view of an embodiment of a flatly spread non-inflated side airbag according to the invention.

FIG. 5 illustrates another embodiment of a side airbag 2 according to the invention in a flatly spread non-inflated condition. In this embodiment, a side airbag 2 in the form of a middle airbag is shown.

The side airbag 2 comprises an inflatable head gas cushion 22 and a torso gas cushion 24 connected to the head gas cushion 22 both of which form separate chambers/gas cushions 8 of the side airbag 2. The two separate gas cushions 8 formed by the head gas cushion 22 and the torso gas cushion 24 are connected to each other in a connecting area 26, wherein overflow openings 27 are disposed in the connecting area 26 so that gas can flow from the torso gas cushion 24 into the head gas cushion 22. In the area of a front edge of the head gas cushion 22 and the torso gas cushion 24, in the shown embodiment moreover a positioning element 44 is secured to the head gas cushion 22 and the torso gas cushion 24. Such a positioning element 44 can additionally help optimize and/or stabilize the positioning and/or the position of the head gas cushion 22 relative to the torso gas cushion 24.

In the shown embodiment, the third fastening point 16 is arranged in a lower area of the rear edge of the torso gas cushion 24.

The first fastening point 12 and the second fastening point 14 are arranged at a longitudinal distance b1 and/or b2 from the rear edge 20 of the head gas cushion 22 in a non-inflatable area 9 of the fabric cut 7 of the head gas cushion 22, wherein the longitudinal distance b1 and/or b2 should be no greater than 100 mm so as to achieve safe and stable positioning of the side airbag 2 in its final inflated shape. In addition, the first fastening point 12 and the second fastening point 14 have a distance a from each other which should be no less than 100 mm to achieve safe and stable positioning of the side airbag 2 in its final inflated shape. In the mounted condition of the side airbag 2, the distance a substantially extends in the vehicle seat transverse direction Q.

FIG. 5 further illustrates that, in the area of the fastening points 12, 14 and 16, additional reinforcing seams 46 are introduced to the fabric cuts 6 of the torso gas cushion 24 and to the fabric cuts 7 of the head gas cushion 22.

Each of the torso gas cushion 24 and the head gas cushion 22 is formed of two fabric cuts 6 and 7 in the shown embodiment, the two fabric cuts 6 of the torso gas cushion 24 being sewn to each other via the circumferential seam 28 and the two fabric cuts 7 of the head gas cushion 22 being sewn to each other via the circumferential seam 29. In such embodiment, the circumferential seams 28 and 29 moreover form a circumferential line that divides the head gas cushion 22 and the torso gas cushion 24 into outer wall portions 54a and 56a close to the vehicle occupant and outer wall portions 54b and 56b remote from the vehicle occupant (see FIG. 7).

Figure 6:
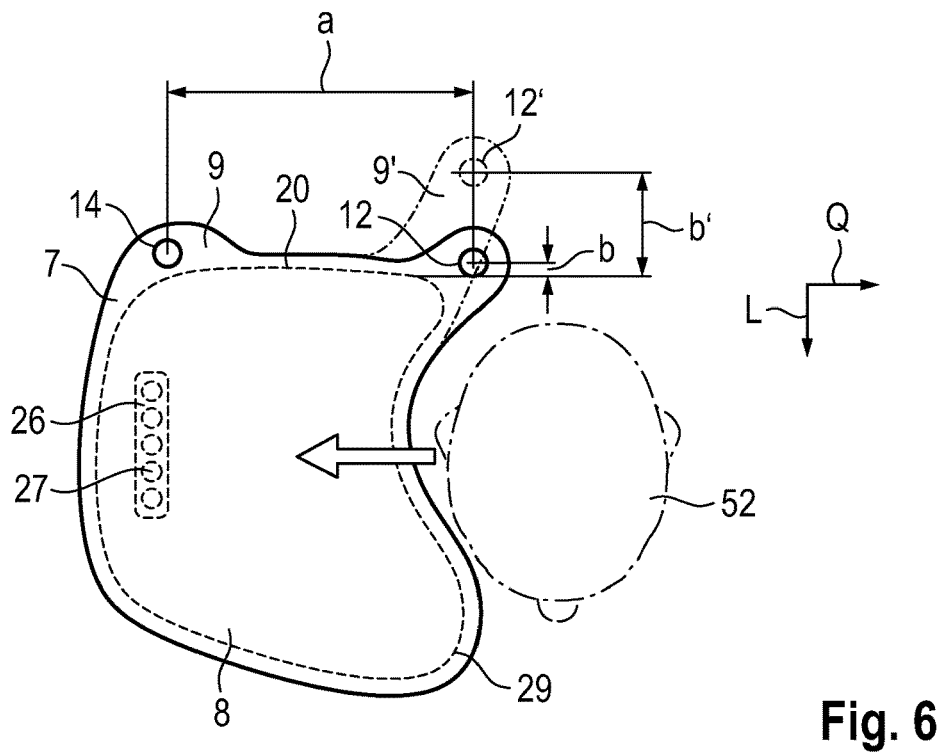
FIG. 6 shows a schematic top view onto a deployed and filled head gas cushion of a side airbag according to the invention.

FIG. 6 illustrates a schematic top view onto an embodiment of a deployed and filled head gas cushion 22 of a side airbag 2 according to the invention as well as a head 52 of a vehicle occupant. It results from FIG. 6 that the first and second fastening points 12 and 14 may have the same longitudinal distance b from the rear edge 20 of the inflatable gas cushion 8 of the head gas cushion 22. It is further illustrated that the first or second fastening point, in this case the first fastening point 12', may have a larger longitudinal distance b' from the rear edge 20 of the inflatable gas cushion 8 of the head gas cushion 22. The distance a and the longitudinal distance b and/or b' can be adapted to a vehicle seat geometry and to a vehicle interior by a person skilled in the art to achieve an as safe and stable positioning of the side airbag 2 as possible, wherein the distance a preferably should be no less than 100 mm and the longitudinal distance b, b' should be no greater than 100 mm.

Figure 7:
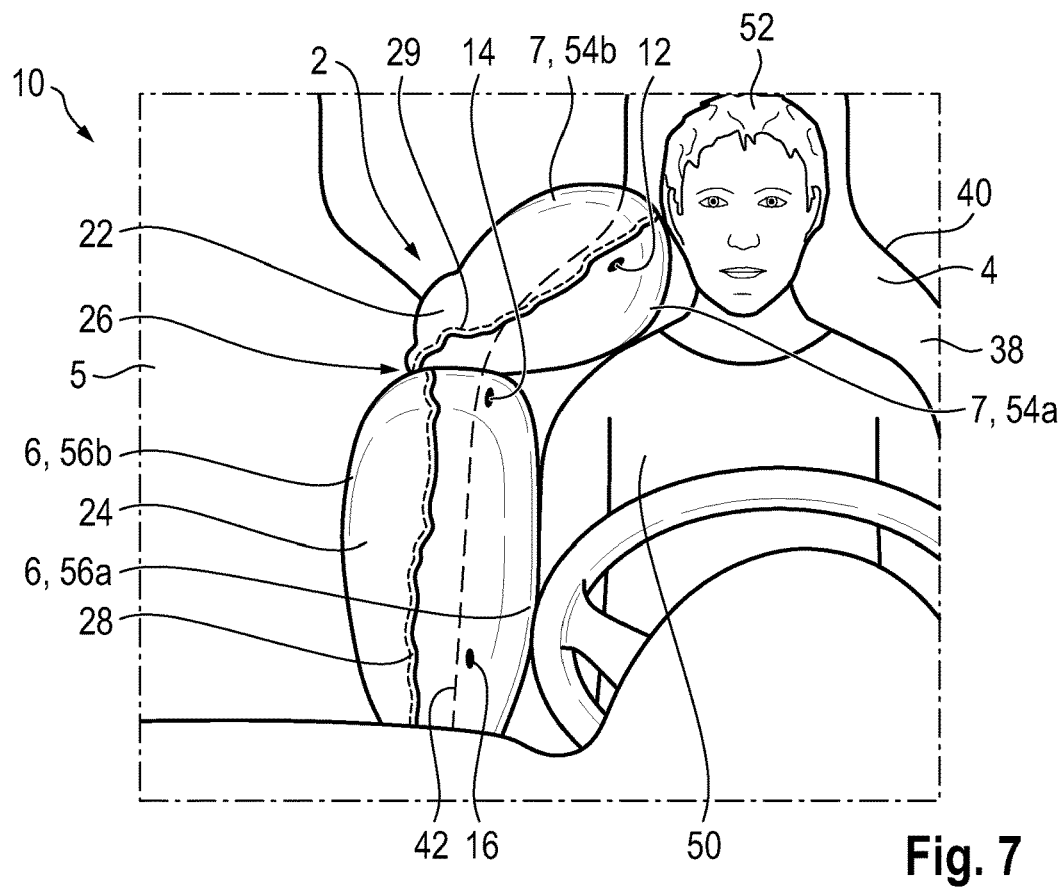
FIG. 7 shows a schematic perspective representation of a vehicle occupant restraint system according to the invention with a side airbag according to the invention in a front view.

FIG. 7 illustrates a vehicle occupant restraint system 10 according to the invention comprising a deployed inflated side airbag 2 according to the invention which is mounted on a vehicle seat 4.

The side airbag 2 is mounted on the driver seat 4 on a side facing the passenger seat 5 in the area of the lateral edge 42 of the backrest 38.

The side airbag 2 of FIG. 7 largely corresponds to the side airbag 2 according to FIG. 5. In contrast to the side airbag 2 according to FIG. 5, the side airbag 2 of the vehicle occupant restraint system 10 of FIG. 7 does not include a positioning element 44. In addition, in this case, the second fastening point 14 is arranged in the fabric cut 6 of the torso gas cushion 24.

The positioning of the side airbag 2 can be additionally optimized and stabilized particularly by the arrangement of the first and second fastening points 12, 14 at a distance a in the vehicle seat transverse direction Q as well as by the arrangement of at least the first fastening point 12 at a longitudinal distance b from the rear edge 20 of the head gas cushion 22.

The invention claimed is:

1. A side airbag of a vehicle occupant restraint system provided to be mounted on a vehicle seat and including at least one fabric cut and one gas cushion, wherein the side airbag includes at least three fastening points for mounting the side airbag on the vehicle seat, in particular on a vehicle seat frame, wherein at least a first fastening point and a second fastening point are arranged in the at least one fabric cut, wherein the first and second fastening points are arranged, in a condition mounted on the vehicle seat, in an upper area of the side airbag and in a vehicle seat transverse direction are arranged at a distance from each other, and wherein the side airbag further comprises an inflatable head gas cushion and an inflatable torso gas cushion connected to the head gas cushion both of which form separate inflatable chambers of the side airbag, wherein the head gas cushion and the torso gas cushion are formed by separate inflatable chambers which are secured to each other in a connecting area, and wherein the first and second fastening points are arranged in the fabric cut of the head gas cushion and a third fastening point is arranged in the fabric cut of the torso gas cushion.

2. The side airbag according to claim 1, wherein the distance in the vehicle seat transverse direction between the first fastening point and the second fastening point is no less than 100 mm.

3. The side airbag according to claim 1, wherein the first and/or second fastening point(s) is/are arranged in a vehicle seat longitudinal direction at a longitudinal distance behind a rear edge of the gas cushion.

4. The side airbag according to claim 3, wherein the longitudinal distance is no greater than 100 mm.

5. The side airbag according to claim 1, characterized by being configured as a middle airbag.

6. A vehicle occupant restraint system comprising a seat-integrated airbag module, comprising a side airbag according claim 1.

7. A vehicle seat comprising a seat-integrated airbag module, wherein the airbag module comprises a side airbag according to claim 1.

8. The vehicle seat according to claim 7, wherein a first fastening location for fastening the first fastening point of the side airbag is arranged in the area of an upper edge of a backrest of the vehicle seat and a third fastening location for fastening the third fastening point of the side airbag is arranged on a lateral edge of the backrest.

9. The vehicle seat according to claim 7, wherein a second fastening location for fastening the second fastening point of the side airbag is arranged on a lateral edge of the backrest in the vehicle seat vertical direction above the third fastening location or in the area of an upper edge of the backrest in the vehicle seat transverse direction closer to the lateral edge of the backrest than the first fastening location and in the vehicle seat vertical direction above the third fastening point.

* * * * *